United States Patent [19]

Heller et al.

[11] 4,101,888

[45] Jul. 18, 1978

[54] ANTICOLLISION CAR RADAR

[75] Inventors: Hans-Dieter Heller, Nurtingen; Wolfram Hertler, Kornwestheim; Karl Petschauer, Karlsruhe, all of Germany

[73] Assignee: ITT Industries, Incorporated, New York, N.Y.

[21] Appl. No.: 742,406

[22] Filed: Nov. 17, 1976

[30] Foreign Application Priority Data

Nov. 27, 1975 [DE] Fed. Rep. of Germany ....... 2553302

[51] Int. Cl.$^2$ .............................................. G01S 9/02
[52] U.S. Cl. ................................................ 343/7 VM
[58] Field of Search .............................. 343/7 VM, 10

[56] References Cited

U.S. PATENT DOCUMENTS 3,778,823  12/1973  Sato et al. ........................ 343/7 VM

FOREIGN PATENT DOCUMENTS 2,327,186  12/1974  Fed. Rep. of Germany ... 343/7 VM

Primary Examiner—T.H. Tubbesing
Attorney, Agent, or Firm—John T. O'Halloran; Alfred C. Hill

[57] ABSTRACT

The radar has two antennas which radiate RF signals of different frequencies and whose radiation patterns overlap. The frequencies of the radiated signals are generated by amplitude-modulating a single RF signal with two low frequency signals. The signals received by one of the two antennas are evaluated by determining, in an evaluating device, the difference between the amplitudes of the RF signals of different frequency which are reflected from an object. A DC voltage signal proportional to the above difference is generated and the DC voltage signal is fed to a threshold circuit whose threshold is determined by a predetermined azimuth range. Therefore, it can be determined if the reflecting object is in the same road lane as a car equipped with the radar.

1 Claim, 4 Drawing Figures

ANTICOLLISION CAR RADAR

BACKGROUND OF THE INVENTION

The present invention relates to a radar device used in motor vehicles.

Radar devices may be used in motor vehicles to measure the distance from, and the speed relative to, a motor vehicle or an obstacle. During the measurement it must be ensured that only reflections from objects located on the same lane as the vehicle to be measured are considered. Reflections from guardrails, traffic signs, and the like must not be taken into account. To accomplish this, a so-called "electronic road channel" is formed, and only reflections of objects located in this electronic road channel are evaluated.

A radar device generating such an electronic road channel is known from German Published Application (DT-OS) No. 2,327,186. In the radar device described there, two antennas with overlapping radiation patterns radiate rf signals of different frequency. The electronic road channel is equal to the overlap area of the two radiation lobes. The signals of different frequency reflected from an object located with this area, which are received by the two antennas and fed to two receivers, have approximately equal amplitudes. Distance and relative speed are measured only when this condition (approx. equal amplitudes) is satisfied.

OBJECT

The object of the invention is to provide a radar device in a motor vehicle to detect objects in the motor vehicle's roadway which is not determined by the geometric shape of the overlap area of the two radiation lobes.

ADVANTAGES

The electronic road channel can be changed or adapted to the lane width in a simple manner. The different frequencies are generated by amplitude-modulating a radio-frequency signal with two low-frequency signals. This requires only one radio-frequency generator. At the receiving end, only one receiver is provided.

DESCRIPTION

The invention will now be explained in more detail with reference to the accompanying drawings, showing, by way of example, an embodiment of an anticollision car radar device, and wherein.

Figure 1:
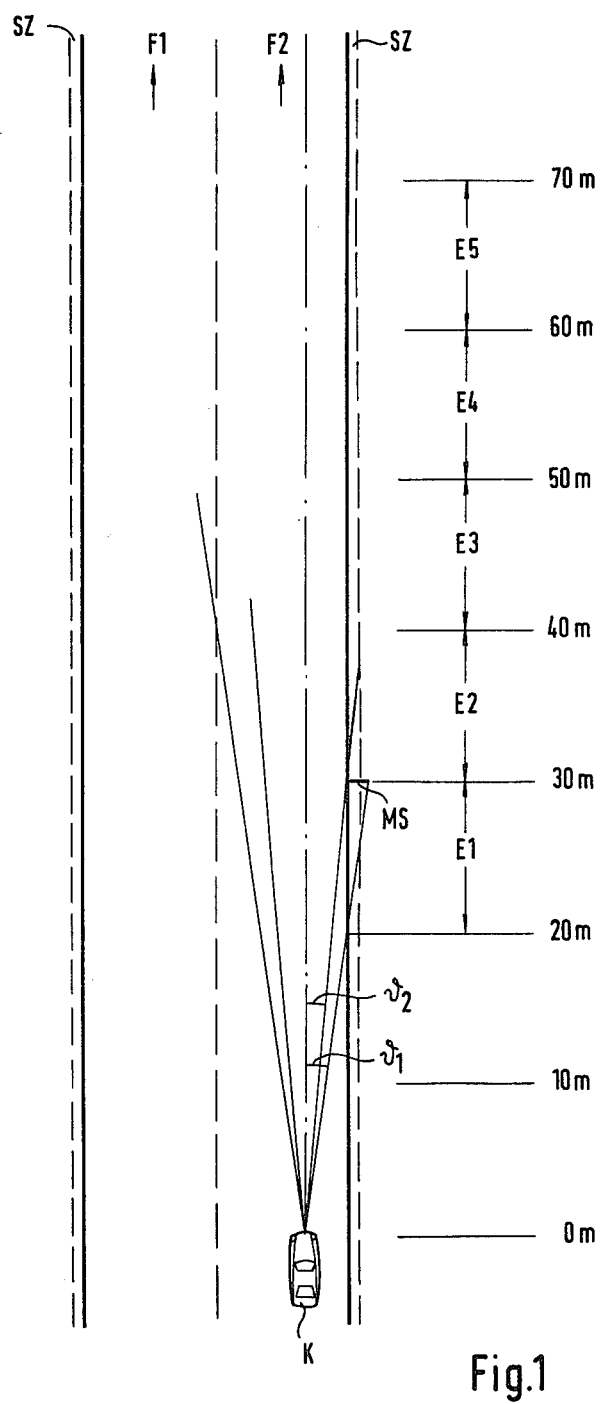
FIG. 1 is a top view of a roadway section in which a vehicle equipped with the radar device according to the invention is travelling.

FIG. 1 shows only one direction of a roadway section. The section has two lanes F1 and F2. On the right lane F2, a vehicle K is travelling at the minimum safe distance from the edge of the road. This representation has been chosen to explain the worst case in which the radar device installed in the vehicle must operate.

Roadways generally have safety zones free from traffic signs, motorist-aid call boxes, and the like on the right and on the left of the lanes F1, F2. These safety zones are designated SZ.

Figure 4:
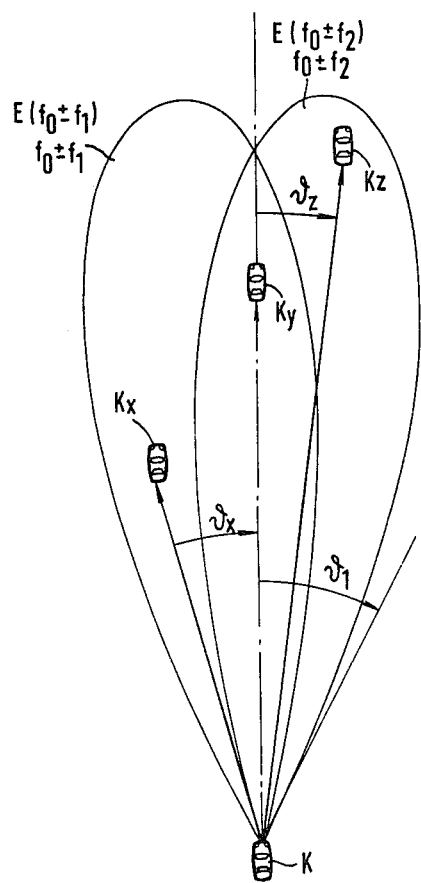
FIG. 4 shows the radiation pattern of the antenna combination of FIG. 2.

Beginning at the vehicle K, distance marks are shown at 10, 20 ... 70 m. In the following it is assumed that the radar device permits no exact measurements within 20 m in front of the vehicle, and that a range up to 150 m is to be covered. Accordingly, there are 13 zones E1 .. . E13. Each distance zone E1 to E13 is allotted an angle $\vartheta 1$ to $\vartheta 13$. Within twice the angle, a vehicle on the lane is detected which is located in the corresponding distance zone. The angle $2\vartheta 1$ is advantageously, but not necessarily, the angular width of the radiation pattern of the radar device's transmitting/receiving antenna, as is shown in FIG. 4.

From FIG. 1 it can be seen that at an angular width $\vartheta 1 = 8°$, which is associated with the zone E1, the radar device also covers a triangular area outside the lane. At 30 m, the short leg MS has a length of 1.5 m, from which the 1-m safety zone must be deducted, so this area is practically negligible.

Figure 2:
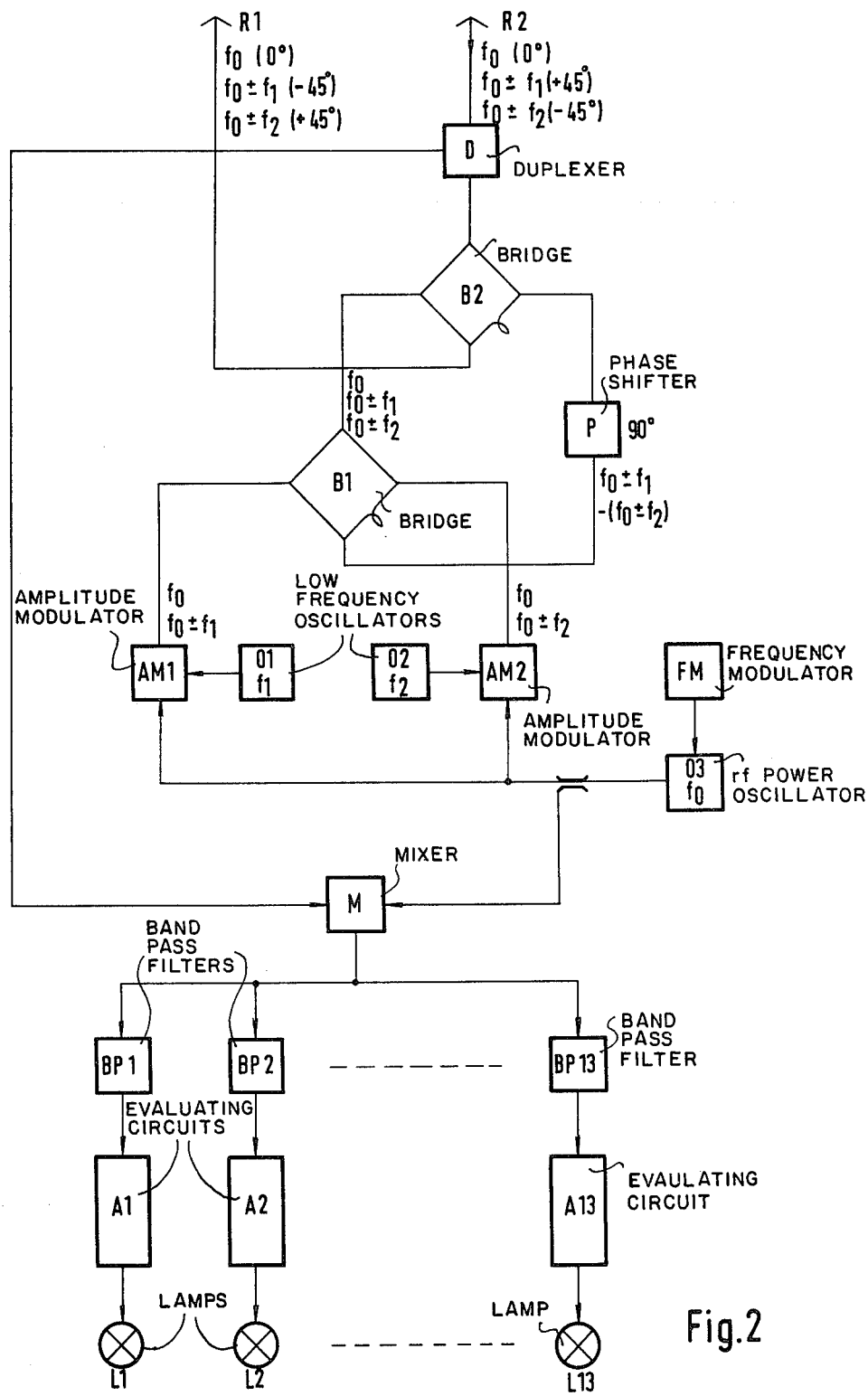
FIG. 2 is a block diagram of the radar device.

FIG. 2 shows a block diagram of the radar device. The parts of the device are partly known and partly new. The known parts form a CW radar device for distance measurement, which will be described first.

The signal of an rf power oscillator 03, which has the frequency $f_0$, is triangularly frequency-modulated with a frequency modulator FM. In the known radar device, the frequency-modulated signal is applied to two transmitting/receiving antennas R1 and R2 through a duplexer D and a diplexer (not shown). These antennas radiate a double-lobe pattern. The signal reflected from an object is applied through the duplexer D to one input of a mixer M to whose other input a small portion of the transmitted signal is applied. Connected to the output of the mixer M is a filter bank consisting of band-pass filters BP1 to BP13 with like, adjacent passbands. The band-pass filters BP1 to BP13 are allotted to the distance zones E1 to E13. A band-pass filter will provide an output signal if a reflecting object is located in the respective distance zone.

The following describes how the known radar device is expanded in accordance with the invention. In the expansion, the signals are additionally amplitude-modulated.

The signal $f_0$ of the oscillator 03 is applied, through two amplitude modulators AM1 and AM2, to two opposite points of a bridge B1 one branch of which contains a 180° phase shifter. In each of the amplitude modulators AM1 and AM2, the frequency-modulated signal $f_0$ is amplitude-modulated with one of two low frequencies $f_1$ and $f_2$ supplied by oscillators 01 and 02, so AM1 provides the frequencies $f_0$ and $f_0 \pm f_1$, and AM2 the frequencies $f_0$ and $f_0 \pm f_2$. The frequency $f_1$ is 6 kHz, and the frequency $f_2$ 10 kHz, for example. The modulation factors are preferably equal. At the upper bridge point, both rf voltages arrive in phase, so the frequencies appearing there are $f_0$, $f_0 \pm f_1$, and $f_0 \pm f_2$. At the fourth bridge point, the voltages are 180° out of phase, so $f_0$ cancels out, and only the frequencies $f_0 \pm f_1$ and $f_0 \pm f_2$ occurs.

The first-mentioned voltages are applied directly to a second bridge B2, and the second voltages are applied to this second bridge through a 90° phase shifter P. One branch of this second bridge, too, contains a 180° phase shifter. At the upper bridge output, the frequencies $f_0$ appear without phase shift, and the frequencies $f_0 \pm f_1$ and $f_0 \pm f_2$ are in quadrature and are fed to the antenna R2 via the duplexer D. At the lower bridge output, the frequencies $f_0$ appear without phase shift, and the frequencies $f_0 \pm f_1$ and $f_0 \pm f_2$ have a 270° phase shift. These frequencies are fed to the antenna R1.

Instead of two antennas, several antennas may be provided.

The antennas R1 and R2 generate together the doublelobe pattern of FIG. 4, which is similar to the radiation pattern of an instrument-landing system. As may be seen in FIG. 4, the field strength E ($f_0 \pm f_1$) prevails on the left-hand side of the axis determined by the vehicle K, while the field strength E ($f_0 \pm f_2$) prevails on the right-hand side. At an arbitrary point, the two rf signals $f_0 \pm f_1$ and $f_0 \pm f_2$ thus have different field strengths (except at points on the axis, where both field strengths are equal in magnitude). Consequently, the rf signals $f_0 \pm f_1$ and $f_0 \pm f_2$ reflected from the vehicles K$x$ and K$z$ and received again have different amplitudes. For a vehicle K$y$ on the axis determined by the vehicle K, the amplitudes are equal in magnitude. The difference between the amplitudes is a measure of the azimuth of the reflecting vehicle, and the sign of the difference indicates whether the vehicle is on the left-hand side or on the right-hand side of the axis. Thus, the azimuth $\vartheta x$ of the vehicle K$x$ is negative, and the azimuth $\vartheta z$ of the vehicle K$z$ is positive. For the vehicle K$y$, $\vartheta y = 0$.

After demodulation, the ratio between the i.f. amplitudes is equal to that between the rf amplitudes provided that no amplitude limitation takes place in the receiver.

Figure 3:
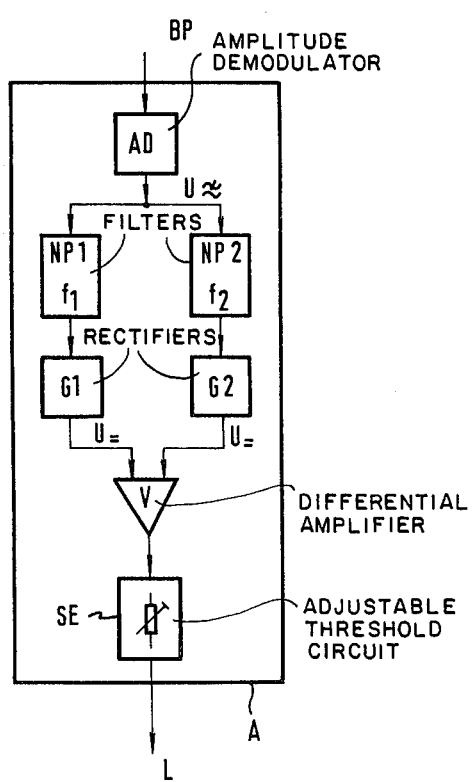
FIG. 3 shows details of an evaluating unit A as illustrated in FIG. 2.

To evaluate the amplitudes, each of the band-pass filters BP1 to BP13 in FIG. 2 is followed by an AM evaluating circuit A1 to A13. Such as evaluating circuit is shown in FIG. 3. The signal coming from the band-pass filter BP is first applied to an AM demodulator AD which provides the two low frequencies $f_1$ and $f_2$. These are separated by means of two filters NP1 and NP2, and then rectified in rectifiers G1 and G2. A differential amplifier V forms the difference between the two voltages. Since a left/right distinction with respect to the vehicle axis is not required, only the amount of the difference is fed to an adjustable threshold circuit SE. The threshold is adjusted in accordance with the maximum value of the angle $\vartheta$ in the respective distance zone. The threshold circuit SE provides an output signal when the difference formed by the differential amplifier V is smaller than the adjusted threshold value, this will be the case if a reflecing object is located in a distant zone E within the angle $\vartheta$ associated with this distance zone.

As can be seen from FIG. 2, a signal appearing at the output of one of the evaluating circuits A1 to A13 turns on the associated indicating lamp from L1 to L13. The vehicle K thus obtains an exact indication of the distance a vehicle is located in front of it provided that the latter is not more than 150 m away. If this vehicle is a passenger car, and a truck, for example, is located in front of it, this truck will be indicated as well. Since only those reflecting objects are to be detected which are located on the lane, an "electronic road channel" is formed for the vehicle K, which is equipped with the radar device. If, in addition the sign of the difference is taken into account, it is also possible to distinguish between obstacles on the right- and on the left-hand side (output of the differential amplifier V positive or negative).

In the manner described, it is also possible to determine the elevations of reflecting objects. This makes it possible, for example, to distinguish a large vehicle on a lane from a bridge extending across the lane. To determine the elevation, an additional antenna is needed which is mounted perpendicular to one of the two antennas R1 and R2.

Azimuth and elevation measurements are advantageously performed using the time-division-multiplex method. The common azimuth and elevation values are linked for each distance zone in a suitable manner.

The invention is applicable in particular to a radar device which measures not only the distance, but also the relative speed of another vehicle located on the lane. In that case, the indication is additionally influenced by the measured relative speed. If the vehicle is to be controlled directly with the measured values, the latter are applied to a processing unit which provides the control signals for the vehicle.

What is claimed is:

1. An anticollision radar for motor vehicles comprising:
   at least two antennas each radiating a radio frequency signal of different frequencies, said two antennas having overlapping radiation patterns;
   a first means coupled to said two antennas to amplitude modulate a single radio frequency signal with two low frequencies to generate said radio frequency signals of different frequencies.
   second means coupled to one of said two antennas to receive said radio frequency signals of different frequencies reflected from an object, to determine the difference between the amplitudes of said two radio frequency signals reflected from said object and to generate a direct current voltage proportional to said difference; and
   third means having a threshold determined by a predetermined azimuth range coupled to said second means, said third means being responsive to said voltage to indicate whether said object is in the same road lane as a motor vehicle equipped with said radar.

* * * * *